United States Patent
Metaxatos et al.

(10) Patent No.: US 8,413,840 B2
(45) Date of Patent: Apr. 9, 2013

(54) HANDLE FOR COOKWARE

(75) Inventors: Paul Metaxatos, Swampscott, MA (US); Bernard Maurer, Weston, MA (US); Andy Padawer, Morris Plains, NJ (US); Duane Kutsch, Richland, WA (US)

(73) Assignees: SEB S.A., Rumilly (FR); Groupe SEB USA, West Orange, NJ (US)

( * ) Notice: Subject to any disclaimer, the term of this patent is extended or adjusted under 35 U.S.C. 154(b) by 1260 days.

(21) Appl. No.: 11/391,715

(22) Filed: Mar. 28, 2006

(65) Prior Publication Data

US 2007/0119744 A1  May 31, 2007

Related U.S. Application Data

(60) Provisional application No. 60/665,927, filed on Mar. 28, 2005.

(51) Int. Cl.
    *B65D 25/10* (2006.01)
(52) U.S. Cl.
    USPC ........ 220/756; 220/573.1; 220/912; 220/380; 220/781; 206/514
(58) Field of Classification Search .................. 206/514; 220/573.1, 781, 380, 752–776, 912
    See application file for complete search history.

(56) References Cited

U.S. PATENT DOCUMENTS

| | | | |
|---|---|---|---|
| 933,136 A | 9/1909 | Sternau et al. | |
| 1,021,425 A * | 3/1912 | Osborn | 248/688 |
| 1,055,500 A * | 3/1913 | Wheeler | 248/688 |
| 1,093,227 A * | 4/1914 | Wheeler | 248/688 |
| 1,268,017 A * | 5/1918 | Knight | 220/573.4 |
| 3,358,878 A * | 12/1967 | Ostborg et al. | 206/514 |
| 3,526,138 A | 9/1970 | Swett et al. | 73/426 |
| 4,204,609 A * | 5/1980 | Kuhn | 220/573.1 |
| 4,572,374 A | 2/1986 | Sirotkin | |
| 5,048,688 A * | 9/1991 | Hicks, Jr. | 206/501 |
| D331,171 S | 11/1992 | Berthet | |
| 5,253,758 A * | 10/1993 | Bissell, II | 206/518 |
| 5,784,953 A * | 7/1998 | Wang | 99/499 |
| D405,313 S | 2/1999 | Kroscher et al. | |
| 5,924,592 A | 7/1999 | Hieronymus | |
| D412,641 S | 8/1999 | Schiffer | |
| D413,492 S * | 9/1999 | Wang | D7/667 |
| 6,049,945 A * | 4/2000 | Prevot et al. | 16/110.1 |
| 6,186,395 B1 | 2/2001 | Kennett | |
| D446,079 S | 8/2001 | Rae | |
| D450,605 S * | 11/2001 | Wright | D10/46.3 |
| D482,234 S | 11/2003 | Rae | |
| 6,854,876 B2 | 2/2005 | Dickson, Jr. | |
| 8,272,531 B2 * | 9/2012 | Cuillery et al. | 220/573.1 |

* cited by examiner

*Primary Examiner* — Anthony Stashick
*Assistant Examiner* — Christopher McKinley
(74) *Attorney, Agent, or Firm* — The Webb Law Firm

(57) ABSTRACT

A handle attached to cookware piece configured to position the cookware piece within a larger cookware piece in a nested arrangement. The handle may include a body having a slot disposed within a bottom surface of the handle body. The slot may be configured such that when a smaller cookware piece is positioned within a larger cookware piece, an upper edge the smaller cookware piece is equal to or less than the same height of an upper edge of the larger cookware piece. The smaller cookware piece may be held by the slot within the larger cookware piece in a substantially horizontal orientation.

20 Claims, 3 Drawing Sheets

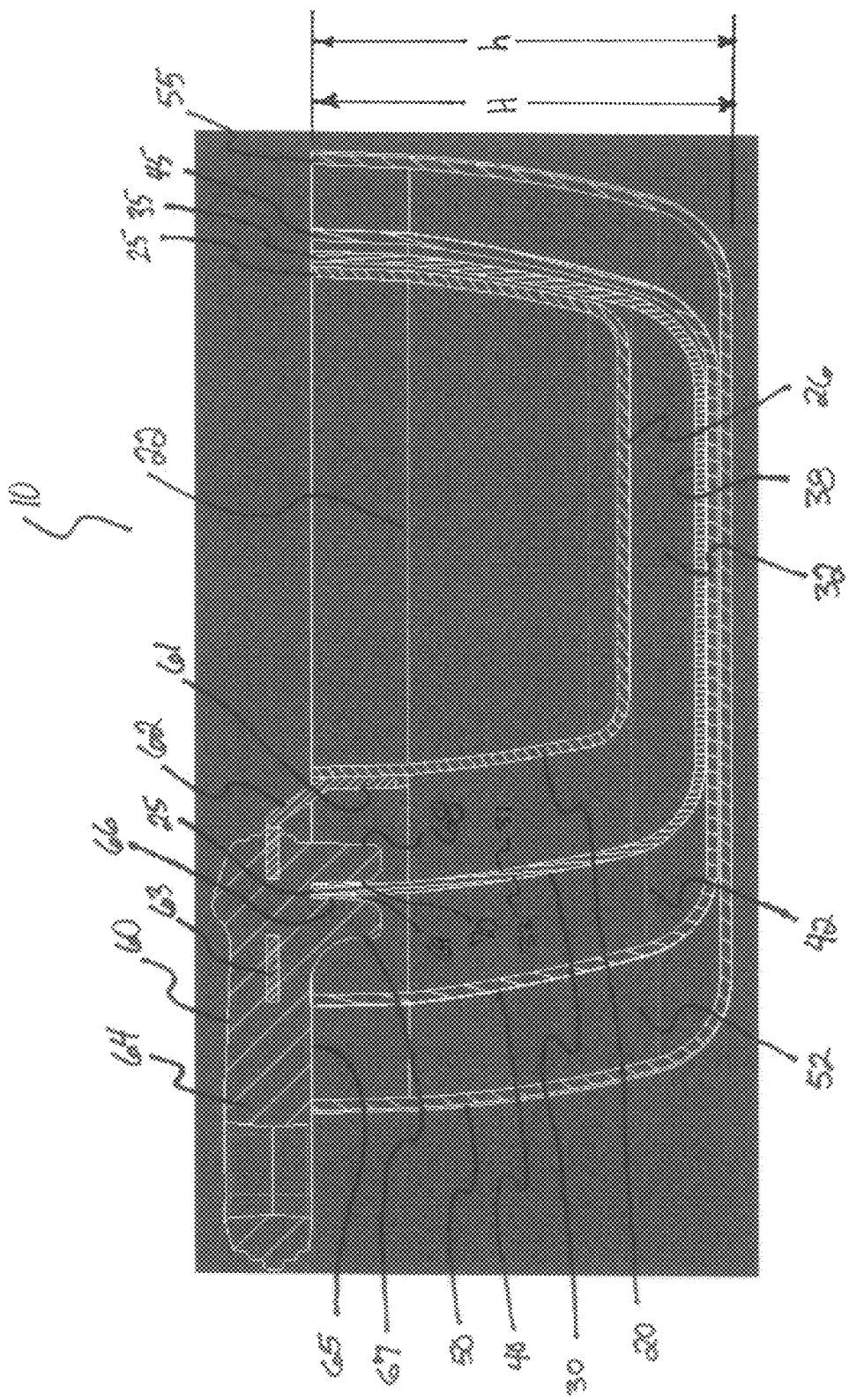

HANDLE FOR COOKWARE

BACKGROUND OF THE INVENTION

The present invention generally relates to improved handles for cookware. More particularly, the present invention relates to a handle for cookware that is configured to enable smaller cookware pieces to be placed or nested within larger cookware pieces in a level stack of cookware.

Consumers have been frustrated for many years by the inability to neatly and efficiently store multiple pieces of cookware (e.g., a variety of sizes of pans, pots, etc.) in cabinets. Although, conventional cookware pieces may nest within one another, there has always been a problem with conventional cookware with attached handles nesting in a level, stacked arrangement due to the handles. Inevitably, the end result of any effort to nest cookware pieces (e.g., pans with handles) within other cookware pieces for storage is an unstable, un-level arrangement that does not make the best use of available storage space due to the acute angle of the nested cookware. This acute angle is caused by the handle of an inner, smaller cookware piece resting on a sidewall of an outer, larger cookware piece.

Generally, cookware designed to address this problem includes either collapsible or removable handles. However, these types of handles create separate problems of their own such as adding complexity to the cookware's design and manufacture and demands on the consumer. In addition, the removable handles also require the consumers to remove and store the handles separately, which adds the potential risk of the consumer misplacing the handles. Thus, there is still a need for an improved handle for cookware.

BRIEF DESCRIPTION OF THE DRAWINGS

While the specification concludes with claims particularly pointing out and distinctly claiming the invention, embodiments of the invention will be better understood from the following description taken in conjunction with the accompanying drawings in which:

FIG. 2 is a cross sectional view of the cookware illustrated in FIG. 1;

Figure 1:
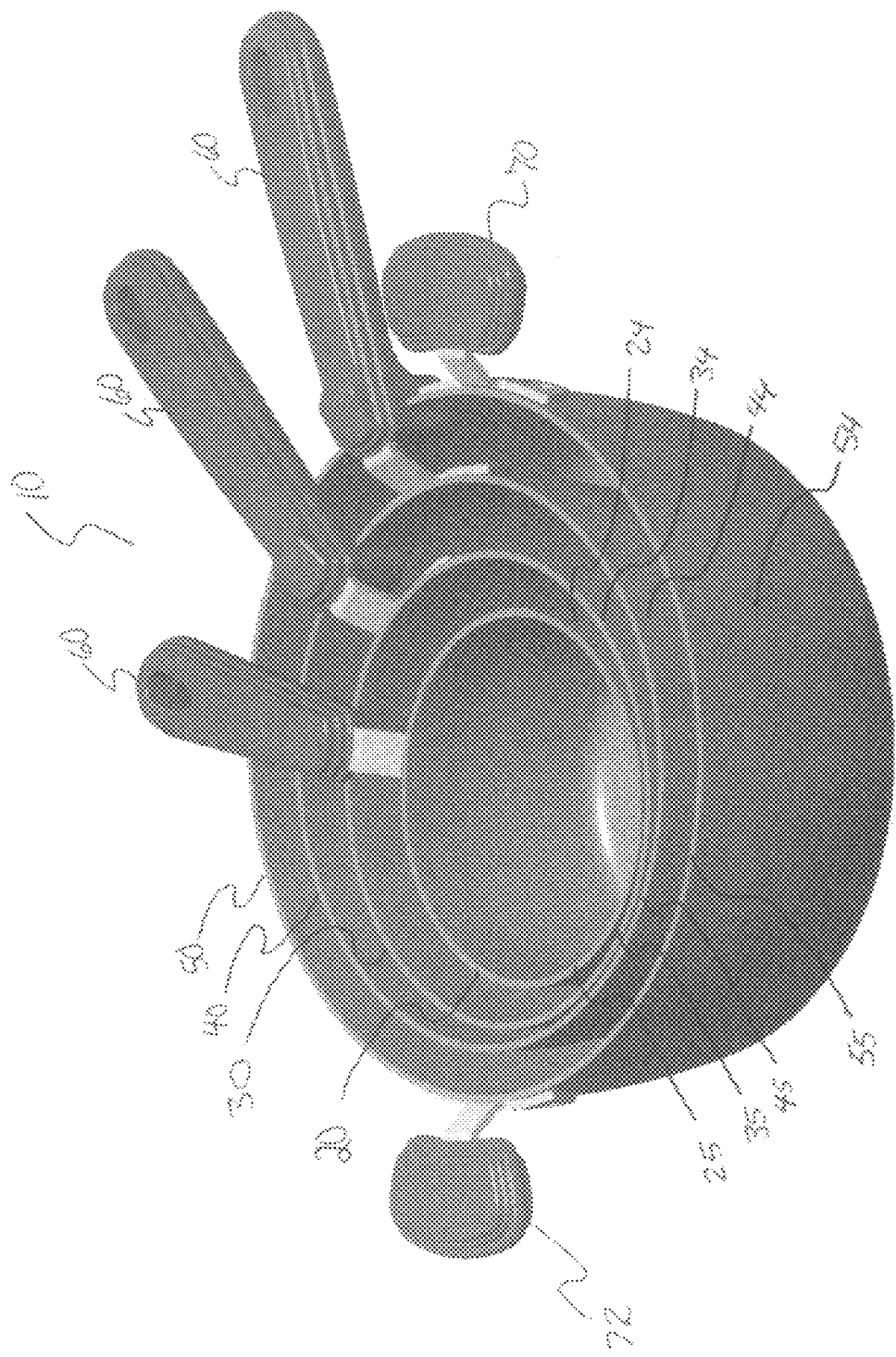
FIG. 1 is a perspective view of an exemplary embodiment of nested cookware in a level stacked arrangement according to the present invention.
Figure 6:
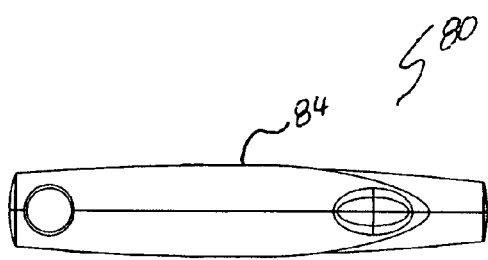
FIG. 6 is a top plan view of the handle illustrated in FIG. 6.
Figure 3:
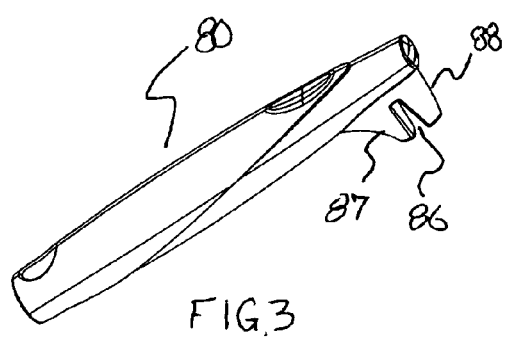
FIG. 3 is a perspective view of another exemplary embodiment of a handle according to the present invention.
Figure 4:
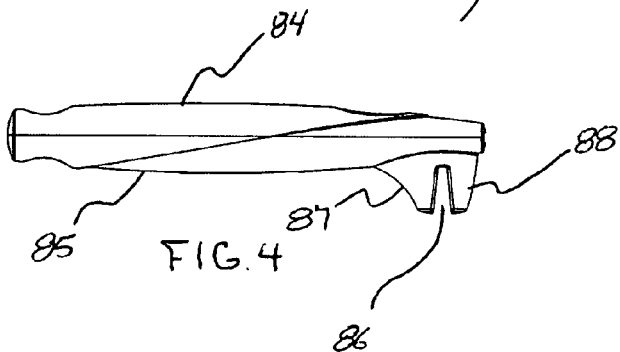
FIG. 4 is a side elevational view of the handle illustrated in FIG. 3.
Figure 5:
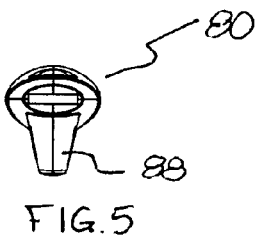
FIG. 5 is a front view of the handle illustrated in FIG. 3.

The embodiments set forth in the drawings are illustrative in nature and not intended to be limiting of the invention which is defined by the claims. Moreover, individual features illustrated in the drawings will be more fully apparent and understood with reference to the following detailed description.

SUMMARY OF THE INVENTION

Accordingly, the present invention is intended to address and obviate problems and shortcomings and otherwise improve previous nested cookware.

One exemplary embodiment of the present invention provides a handle for cookware including a body configured to attach to a first cookware piece and having a bottom side and a slot disposed along the bottom side of the body, wherein the slot is configured to engage a sidewall of a second cookware piece in order to hold the first cookware piece within the second cookware piece such that an upper edge of the first cookware piece does not extend substantially beyond an upper edge of the second cookware piece.

Another exemplary embodiment of the present invention provides a first cookware piece including a sidewall, an upper edge disposed along the sidewall, and a handle attached to the sidewall, wherein the handle comprises a body and a support device for holding the first cookware piece in a substantially horizontal position within a second cookware piece such that the upper edge of the cookware piece is at a height equal to or less than a height of an upper edge of the second cookware piece.

Still another exemplary embodiment of the present invention provides an arrangement of cookware pieces including a first cookware and a second cookware piece. The first cookware piece includes a first sidewall, a first upper edge along the first sidewall, and a first handle attached to the first sidewall, wherein the first handle includes a first positioning device disposed along the first handle. The second cookware piece includes a second sidewall and a second upper edge along the second sidewall. The arrangement of cookware includes the first cookware piece disposed within the second cookware piece such that the first positioning device engages the second sidewall in order to position the first upper edge at a height equal to or less than a height of the second upper edge.

DETAILED DESCRIPTION OF THE PREFERRED EMBODIMENT

Reference will now be made in detail to various embodiments of the invention, examples of which are illustrated in the accompanying drawings, wherein like numerals indicate similar elements throughout the views.

Referring to FIGS. 1-2, an exemplary embodiment of a stack of cookware pieces 10 according to the present invention is shown. Such an embodiment saves space within storage cabinets and permits multiple cookware pieces to be neatly stacked and stored within the cabinets. Stack of cookware 10 comprises a plurality of cookware pieces (e.g., first pot 20, second pot 30, third pot 40, and fourth pot 50), each placed within the next consecutively larger cookware piece (e.g., first pot 20 disposed within second pot 30). It is understood that level, stack of cookware 10 may include any number of cookware pieces. In addition, stack of cookware 10 may comprise any type of cookware, including but not limited to pans, pots, woks, broilers, or any other type of cookware designed for food as known to one of ordinary skill in the art. Each cookware piece of stack of cookware 10 may or may not include one or more handles. As shown in the FIGS. 1-2, each cookware piece of stack of cookware 10 is disposed in a substantially level along an imaginary horizontal plane or substantially horizontal orientation.

For illustration purposes only, and not limitation, a cookware piece such as first pot 20, second pot 30, third pot 40, fourth pot 50, etc., may include a sidewall 24, a bottom wall 26, an upper edge 25 disposed along the sidewall, a cavity 22 formed by the sidewall and bottom wall, and a handle 60. In the exemplary embodiment, stack of cookware 10 includes a first pot 20 positioned within a cavity 32 of a larger, second pot 30, second pot 30 positioned within a cavity 42 of a third pot 40 that is larger than second pot 30, third pot 40 positioned within a cavity 52 of a fourth pot 50 that is larger than third pot 40. As shown in FIG. 2, each of the pots (e.g., 20, 30, 40, and 50) are in a substantially horizontal, stacked arrangement of cookware pieces 10.

In the exemplary embodiment, pots 20, 30, and 40 include a handle 60 attached to a sidewall (e.g., sidewalls 24, 34, and 44, respectively), and pot 50 includes handles 70 and 72 attached to a side wall 54 opposite each other. However, it is understood that all the pots may include handle 60. Specifically, handle 60 may include a transition portion 62, a body 64 connected to transition portion 62, and a supporting device, or positioning device positioned along a bottom surface 65 of body 64. Supporting or position device, in this exemplary embodiment, comprises a slot 66 which is formed from a first extension 67 and a second extension 68 extending outwardly from bottom surface 65 of body 64. Slot 66 may include opposite inside surfaces 69 and 70, respectively.

A first end 61 of transition portion 62 is attached to the pot and a second end 63 is attached to body 64 such that handle 60 extends outwardly from the pot. In the exemplary embodiment shown, handle 60 extends from the sidewall (e.g., sidewall 24) of the pot in a substantially horizontal orientation. Handle 60 may be attached to the pot in any known or yet-to-be developed method as known to one of ordinary skill in the art, including but not limited to welding, rivets, etc., without departing from the spirit and scope of the present invention. For example, first end 61 may be welded to the sidewall (e.g., sidewall 24) of the pot.

In addition, transition portion 62 may be fabricated from a variety of materials (e.g., metal, composite, ceramic, etc.). Such material may be configured to either completely prevent or partially prevent the transfer of heat from the pot to body 64. Body 64 may be fabricated from a variety of materials, including but not limited to wood, plastic, composites, metal, etc. In this exemplary embodiment, body 64 is fabricated from plastic using any conventional plastic forming method (e.g., injection molding, thermoforming, etc.) as known to one of ordinary skill in the art. When body 64 is formed, it may be formed completely or partially around second end 63 of transition portion 62 such that transition portion 62 and body 64 form an integral unit.

As shown in FIGS. 1 and 2, slot 66 of handle 60 is positioned and configured such that when a smaller pot (e.g., first pot 20) is inserted into the cavity (e.g., second cavity 32) of a larger pot (e.g., second pot 30), slot 66 engages a sidewall (e.g., sidewall 34) of the larger pot (e.g., second pot 30) by permitting the sidewall to slide between first and second extensions 67 and 68 such that the opposite inside slot surfaces 69 and 70 engage respective inside and outside sidewall surfaces of the sidewall (e.g., inside sidewall surface 31 and outside sidewall surface 33).

Slot 66 holds the smaller pot (e.g., pot 20) nested within the larger, outer pot (e.g., second pot 30). Nested, as used herein, is defined as a smaller cookware piece positioned within a second larger cookware piece such that an upper edge (e.g., upper edge 25) of a sidewall (e.g., sidewall 24) of the smaller cookware piece (e.g., first pot 20) is at a height equal to or less than the height (H) of the larger, outer cookware piece (e.g., second pot 30) along an imaginary horizontal plane. In one exemplary embodiment, the upper edge of the smaller pot (e.g., upper edge 25) is held substantially even with the upper edge of the larger, outer pot (e.g., upper edge 35). Slot 66 may also hold the smaller pot (e.g., first pot 20) within the larger pot (e.g., second pot 30) in a substantially horizontal orientation and such that a bottom outer surface (e.g., bottom outer surface 26 of first pot 20) of the smaller pot is substantially parallel to a bottom inner surface (e.g., bottom inner surface 38 of second pot 30) of the larger, outer pot (e.g., second pot 30).

In addition, bottom surface 65 of handle 60 may rest upon the upper edges (e.g., upper edges 45 and 55 of pots 40 and 50, respectively) of any larger, outer pots that are not slid into slot 66. Each handle 60 of the consecutively larger pots (e.g., second pot 30, third pot 40, and fourth pot 50) may include the same components and configuration as described above such that the plurality of pots may be positioned in the stack of cookware 10 such that each pot is held in a substantially horizontal orientation and, optionally, nested within the consecutively larger pot as shown and described herein (e.g., FIGS. 1 and 2). Handle 60 may also comprise any variety of shapes and sizes without departing from the spirit and scope of the present invention.

For example, referring to FIGS. 3-6, another exemplary embodiment of a handle according to the present invention is shown as handle 80. Handle 80 includes a body 84 and a slot 86 positioned along a bottom surface 85 of body 84. Body 84 may include a first extension 87 and a second extension 88 extending outwardly from bottom surface 85 and configured to form slot 86. Handle 80 may be attached to a pot in a variety of known or yet-to-be developed methods as known to one of ordinary skill in the art, including but not limited to the method shown and described above with reference to handle 60.

Also, the cookware (e.g., first pot 20, second pot 30, third pot 40, and fourth pot 50) may include more than one handle attached thereto. For example, the cookware pieces of the present invention may include two or more of handle 60 or two or more of handle 80 attached opposite each other to the sidewall (e.g., sidewall 24) of the cookware. In another exemplary embodiment, each pot may include two handles configured similar to handles 70 and 72 of pot 50 (FIG. 1). However, in this exemplary embodiment, the handles (e.g., handles 70 and 72) include a slot (not shown) along each handle's bottom surface, the same or similar as slot 66, that is positioned and configured to hold each consecutively smaller pot nested within a larger pot in a level stacked arrangement.

The handles of the present invention may include additional features, components, etc. as known to one of ordinary skill in the art, including but not limited ergonomic designs (e.g., protrusions or indentations conforming to the fingers and/or thumbs of users), holes through the handle body to allow for the pots to be hung, etc., without departing from the spirit and scope of the present invention. Accordingly, this invention is intended to embrace all alternatives, modifications and variations that have been discussed herein, and others that fall within the spirit and scope of the claims.

What is claimed is:

1. A handle for cookware comprising:
  a body having a first end and a second end, the body having a transition portion and configured to attach to a first cookware piece and having a bottom side, wherein the transition portion is configured to at least partially prevent transfer of heat from the cookware to the body of the handle;
  a slot disposed along the bottom side of the body;
  wherein the slot is configured to engage a sidewall of a second cookware piece in order to hold the first cookware piece within the second cookware piece during storage of the cookware such that an upper edge of the first cookware piece does not extend substantially beyond an upper edge of the second cookware piece; and
  wherein the first cookware piece is removed from within the second cookware piece during use, wherein the body extends from the first end to the second end in a substantially horizontal orientation with respect to the first cookware piece.

2. The handle according to claim 1, wherein the handle is configured to hold the first cookware piece within a second cookware piece via the slot such that the upper edge of the first cookware piece is maintained at substantially the same level along a horizontal plane as an upper edge of the second cookware piece.

3. A first cookware piece, comprising:
a fully closed lateral sidewall;
an upper edge disposed along the sidewall; and
a handle attached to the sidewall, wherein the handle comprises a transition portion, a body connected to the transition portion, the body having a first end and a second end, and a support device for holding the first cookware piece in a substantially horizontal position within a second cookware piece during storage such that the upper edge of the cookware piece is at a height equal to or less than a height of an upper edge of the second cookware piece, wherein the first cookware piece is removed from within the second cookware piece during use, and wherein the body extends from the first end to the second end in a substantially horizontal orientation with respect to the first cookware piece, wherein the transition portion is configured to at least partially prevent transfer of heat from the first cookware piece to the body of the handle.

4. The cookware piece according to claim 3, wherein the support device is configured to engage a sidewall of the second cookware piece in order to hold the first cookware piece.

5. The cookware piece according to claim 3, wherein the support device comprises a slot disposed along a bottom side of the handle, and wherein the slot is configured to engage a sidewall of the second cookware piece in order to hold the first cookware piece.

6. The cookware piece according to claim 5, wherein the slot is integral to the body of the handle.

7. The cookware piece according to claim 5, wherein the slot comprises first and second slot surfaces, and wherein the first inside slot surface engages an inside sidewall surface of the second cookware piece and the second inside slot surface engages an outside sidewall surface of second cookware piece.

8. The cookware piece according to claim 3, wherein the support device is configured to enable the first cookware piece to be disposed within a larger second cookware piece in a substantially horizontal orientation.

9. An arrangement of cookware pieces, comprising:
a first cookware piece having a first fully closed lateral sidewall, a first upper edge along the first sidewall, and a first handle having a transition portion and a body connected to the transition portion, with the transition portion attached to the first sidewall, wherein the first handle comprises a body having a first end and a second end and includes a first positioning device disposed along the first handle; and
a second cookware piece having a second sidewall and a second upper edge along the second sidewall;
wherein the first cookware piece is disposed within the second cookware piece during storage of the cookware such that the first positioning device engages the second sidewall, positioning the first upper edge at a height equal to or less than a height of the second upper edge;
wherein the first cookware piece is removed from within the second cookware piece during use, and wherein the body extends from the first end to the second end in a substantially horizontal orientation with respect to the first cookware piece, and wherein the transition portion is configured to at least partially prevent transfer of heat from the first cookware piece to the body of the handle.

10. The arrangement of cookware pieces according to claim 9, wherein the first support device comprises a first slot disposed along a first bottom side of the first handle, and wherein the first slot is configured to engage the second sidewall in order to hold the first cookware piece within the second cookware piece.

11. The arrangement of cookware pieces according to claim 10, wherein the first handle comprises a first body, and wherein the first slot is integral to the first body.

12. The arrangement of cookware pieces according to claim 10, wherein the first slot comprises two opposite inside slot surfaces, wherein the second sidewall comprises inside and outside second sidewall surfaces, and wherein the two opposite inside slot surfaces engage the respective inside and outside second sidewall surfaces.

13. The arrangement of cookware pieces according to claim 10, wherein the first upper edge does not extend beyond the second upper edge along a horizontal plane.

14. The arrangement of cookware pieces according to claim 9, wherein the first positioning device suspends the first cookware piece within the second cookware piece.

15. The arrangement of cookware pieces according to claim 9, wherein the second cookware piece further comprises a second handle attached to the second sidewall, and wherein the second handle includes a second positioning device disposed along the second handle.

16. The arrangement of cookware pieces according to claim 15, further comprising a third cookware piece having a third sidewall, and a third upper edge along the third sidewall, wherein the first and second cookware pieces are disposed within the third cookware piece such that the second positioning device engages the third sidewall, positioning the first and second upper edges at a height equal to or less than a height of the third upper edge.

17. The arrangement of cookware pieces according to claim 16, wherein the first and second positioning devices hold first and second cookware pieces in a substantially horizontal position.

18. The arrangement of cookware pieces according to claim 16, wherein the first, second, and third upper edges are at a level substantially equal to one another along a horizontal plane.

19. The arrangement of cookware pieces according to claim 9, wherein a first outside surface of the first sidewall does not substantially engage a second outside surface of the second sidewall.

20. The arrangement of cookware pieces according to claim 9, wherein the first cookware piece is nested within the second cookware piece.

* * * * *